2,717,258

METHODS FOR PREPARING DIMETHYL SILANEDIOL

Simon W. Kantor, Schenectady, N. Y., assignor to General Electric Company, a corporation of New York No Drawing. Application February 25, 1953, Serial No. 338,873

2 Claims. (Cl. 260—448.2)

This invention is concerned with a method for preparing dimethyl silanediol and more particularly relates to a process for making the latter compound by hydrolyzing a dimethyl dialkoxy silane with distilled water or water substantially free of traces of acids or alkali, and thereafter isolating the formed dimethyl silanediol.

Organosilanediols having the formula $R_2Si(OH)_2$ where R is ethyl, n-propyl and n-butyl have been obtained by hydrolyzing the corresponding organochlorosilane under carefully controlled conditions. However, it has been impossible to obtain the monomeric dimethyl silanediol because of the rapid condensation of this compound even at a temperature of 0° C.

It has now been discovered that this hitherto unobtainable dimethyl silanediol can be readily prepared and isolated in pure form by hydrolyzing a dimethyl dialkoxy silane having the general formula $$(CH_3)_2Si(OZ)_2$$

where Z is an alkyl radical including lower alkyl radicals, for instance, methyl, ethyl, propyl, isopropyl, butyl, amyl, isoamyl, decyl, etc., using neutral water, that is, water having a pH of about 7.0 and which is almost completely free of any traces of acid or alkali which may effect condensation of the above-described silanol. This hydrolysis may be carried out at various temperatures ranging from about 25° C. or lower to the boiling point of the water being used for the purpose. Generally, it is only necessary to effect mixing of the dimethyl dialkoxy silane with an amount of water in excess of that required for complete hydrolysis of the former to the dimethyl silanediol, and heating the mixture at the boiling point of the mass until the dimethyl dialkoxy silane has completely reacted. The time of heating will vary depending on the type of alkoxy group; the longer the alkyl group in the alkoxy radical, the longer will be the time required to effect complete reaction. The reaction mass is advantageously evaporated at room temperature (either at atmospheric or sub-atmospheric pressures) to give a semi-solid which after washing with a suitable organic solvent (which is not a solvent for the dimethyl silanediol) such as, for instance, hot n-hexane, will leave behind crystalline dimethyl silanediol in essentially pure form.

The dimethyl silanediol is very sensitive to traces of acid or base, both of which condense it to polysiloxanes, the major portion of the condensation product consisting of hexamethylcyclotrisiloxane and octamethylcyclotetrasiloxane. Dimethyl silanediol has been kept for several weeks in an evacuated glass tube immersed in liquid nitrogen. The use of the usual soft glass containers (e. g., those containing alkali or alkaline oxides) at room temperature should be avoided because there is sufficient alkali in the glass to effect condensation of the dimethyl silanediol. It is also important that in the hydrolysis of the dimethyl dialkoxy silane, when carried out in glass, the latter should be washed with an acid and then followed by many rinses of distilled water to effect complete removal of any residual acid or alkali. Preferably it is desired to carry out the reaction in quartz equipment.

In order that those skilled in the art may better understand how the present invention may be practiced, the following examples are given by way of illustration and not by way of limitation. All parts are by weight.

Example 1

To a stirred solution of 645 parts (5 mols) dimethyldichlorosilane and 606 parts (5 mols) dimethylaniline (employed as a hydrohalide acceptor), was gradually added with stirring a solution of 641 parts (20 mols) methyl alcohol and 631 parts (5.2 mols) dimethylaniline. The exit end of the tube used for adding the solution of the methyl alcohol and dimethylaniline was below the level of the reaction mixture and the addition was maintained at a rate that caused gentle refluxing. When all the material had been added, the mixture was refluxed for about an additional one hour and after cooling to room temperature, the upper layer was separated and fractionated to give essentially pure dimethyldimethoxysilane boiling at 80–80.5° C. The composition of this material was confirmed by analysis which showed that it contained 39.6% carbon and 10.6% hydrogen (theoretical 39.97% carbon and 7.07% hydrogen).

Example 2

A mixture was prepared of 10 grams of the dimethyl dimethoxysilane prepared in Example 1 with 40 grams of distilled water (pH=7). This mixture was heated at the reflux temperature of the mass in a flask and condenser that had been thoroughly washed with cleaning solution (for glassware) and distilled water. After 10 minutes reflux, a clear solution was obtained which was cooled immediately to room temperature. This solution was placed in a clean crystallizing dish and allowed to evaporate at room temperature with a current of dry nitrogen passing over the surface of the solution. A semi-solid residue was obtained which was washed twice with 50 ml. portions of hot n-hexane leaving the insoluble dimethylsilanediol in essentially pure form. The crystals of dimethyl silanediol were further purified by boiling the latter for three minutes with about 40 ml. of n-hexane and after filtering the hot mixture, the insoluble solid pure dimethyl silanediol was transferred to a glass tube and dried in vacuo. Dimethyl silanediol melts at 100–101° C. Its identity was established by analysis which showed it to contain 26.4% carbon, 8.8% hydrogen, and 30.0% silicon (theoretical 27.07% carbon, 8.75% hydrogen, and 30.45% silicon).

The dimethyl silanediol prepared in accordance with the present invention may be condensed with traces of acid such as hydrochloric acid, sulfuric acid, etc., to give cyclic dimethylsiloxanes which, in turn, can be condensed to highly viscous gummy solids by means of alkaline catalysts such as sodium hydroxide, potassium hydroxide, etc. The latter condensed materials can then be mixed with various fillers such as silica aerogel and a curing agent such as benzoyl peroxide and cured to make heat-converted solid elastic organopolysiloxanes (more commonly identified as silicone rubbers) which have utility, for instance, as gaskets, etc., for applications requiring good resistance to elevated temperatures.

What I claim as new and desire to secure by Letters Patent of the United States is:

1. The process for making dimethyl silanediol which comprises forming a mixture of ingredients completely free of any traces of acid and alkali and comprising a dimethyldialkoxysilane and neutral water, the said water being in an amount in excess of that required for complete hydrolysis of the dimethyl dialkoxysilane to dimethyl silanediol, thereafter heating the reaction mixture, and isolating the dimethyl silanediol.

2. The process of making dimethyl silanediol which comprises forming a mixture of ingredients completely free of any traces of acid and alkali and comprising dimethyl dimethoxy silane and distilled water having a pH of around 7, the said water being present in an amount in excess of that required for complete hydrolysis of the dimethyl dimethoxysilane to form dimethyl silanediol, heating the mixture of ingredients at the boiling point of the mass, and isolating crystalline dimethyl silanediol melting at around 100–101° C.

References Cited in the file of this patent

UNITED STATES PATENTS 2,415,389   Hunter _____ Feb. 4, 1947